United States Patent [19]

VerMehren

[11] 4,249,984

[45] Feb. 10, 1981

[54] GUMMING APPARATUS

[75] Inventor: Hubert R. VerMehren, Florissant, Mo.

[73] Assignee: Ga-Vehren Engineering Company, St. Louis, Mo.

[21] Appl. No.: 909,064

[22] Filed: May 24, 1978

[51] Int. Cl.[3] ........................ B32B 31/10; B32B 31/12

[52] U.S. Cl. .................................... 156/552; 118/212; 118/249; 156/578; 198/575; 198/576

[58] Field of Search ............... 156/291, 519, 552, 560, 156/578, 384, 387; 198/575, 576, 579; 118/210, 212, 224, 244, 221, 249; 101/152, 153, 23, 182, 219, 247

[56] References Cited

U.S. PATENT DOCUMENTS

| | | | |
|---|---|---|---|
| 2,690,121 | 9/1954 | Auerbacher et al. | 101/247 |
| 2,920,503 | 1/1960 | Burrows | 198/575 |
| 2,977,271 | 3/1961 | Cutwack | 156/552 |
| 2,993,528 | 7/1961 | Plant, Jr. | 156/291 |
| 4,092,207 | 5/1978 | Zodrow | 156/571 |

FOREIGN PATENT DOCUMENTS

| | | | |
|---|---|---|---|
| 647613 | 12/1950 | United Kingdom | 101/152 |

*Primary Examiner*—Michael G. Wityshyn
*Attorney, Agent, or Firm*—Cohn, Powell & Hind

[57] ABSTRACT

This gumming apparatus is intended for use primarily with continuous web business form processing machines. The apparatus includes a gumming cylinder disposed transversely of the continuous form conveyor of the machine to apply gum at equal intervals along the length of the continuous web. The cylinder is mounted in an adjustable slide assembly which permits rapid removal of the cylinder for replacement by another cylinder of a different size to suit a different size of business form. The removable cylinder includes an end gear driven by a drive assembly which includes a swinging gear to permit rapid replacement of the cylinder. A second conveyor for depositing inserts onto the continuous web is speed coordinated with the web conveyor by means of a removable conveyor drive gear which is driven by the drive assembly and also includes a swinging gear to permit replacement of the drive gear at the same time as the cylinder is replaced.

12 Claims, 4 Drawing Figures

GUMMING APPARATUS

BACKGROUND OF THE INVENTION

This invention relates generally to a gumming roll apparatus for applying gum to blanks and particularly to an apparatus for applying gum to continuous web business forms during processing.

Machines for processing continuous business forms of the type consisting of a web divided, for example by perforations, into a plurality of separable individual forms are provided with gumming apparatus to accomplish various gumming operations such as the attachment of inserts and the attachment of an overlying web to form continuous envelopes. The size of the individual business forms can vary considerably to suit the requirements of individual users and it becomes a problem to adjust the gumming apparatus to suit a range of sizes. One approach to this problem is to provide a machine which operates intermittently and is timed to pause at selected intervals. This machine has obvious disadvantages related not only to speed delay but complexity and wear of the operating mechanisms.

The present apparatus solves this and other problems in a manner not disclosed in the known prior art.

SUMMARY OF THE INVENTION

This gumming apparatus provides a means of applying gum at selected intervals to a continuous web business form while the web is running continuously and can be rapidly adjusted to suit individual business forms of different length and width by replacement of the gumming cylinder with a cylinder specifically suited to the particular business form size without changing the speed of the web.

The apparatus includes a gumming cylinder mounted to a support means and receiving gum from a gum supply, the gumming roll being diametrically sized to apply gum to the continuous web at equal intervals along the length thereof and drive means for driving the web at a selected linear speed and having means for rotating the gumming cylinder at a corresponding angular speed.

The apparatus includes a mounting means for removably mounting the gumming cylinder to the support means in sliding adjustable relation for removal of said cylinder and rapid replacement thereof with a cylinder of different diameter.

The gumming cylinder includes an end gear operatively driven by the drive means through the medium of a gear train which includes an idler gear pivotally mounted to the support means for swinging movement into and out of engagement with the gumming cylinder gear to accommodate a size change of said gumming cylinder.

The apparatus is coordinated with a continuously running insert conveyor and provides a means of changing the delivery speed of the inserts at the same time as the gumming cylinder is changed to suit a different business form size.

The insert conveyor includes a removable drive gear which is connected to the drive means by a gear train, said gear train including an idler gear pivotally mounted to the support means for swinging movement into and out of engagement with said conveyor drive gear.

DESCRIPTION OF THE PREFERRED EMBODIMENT

Figure 1:
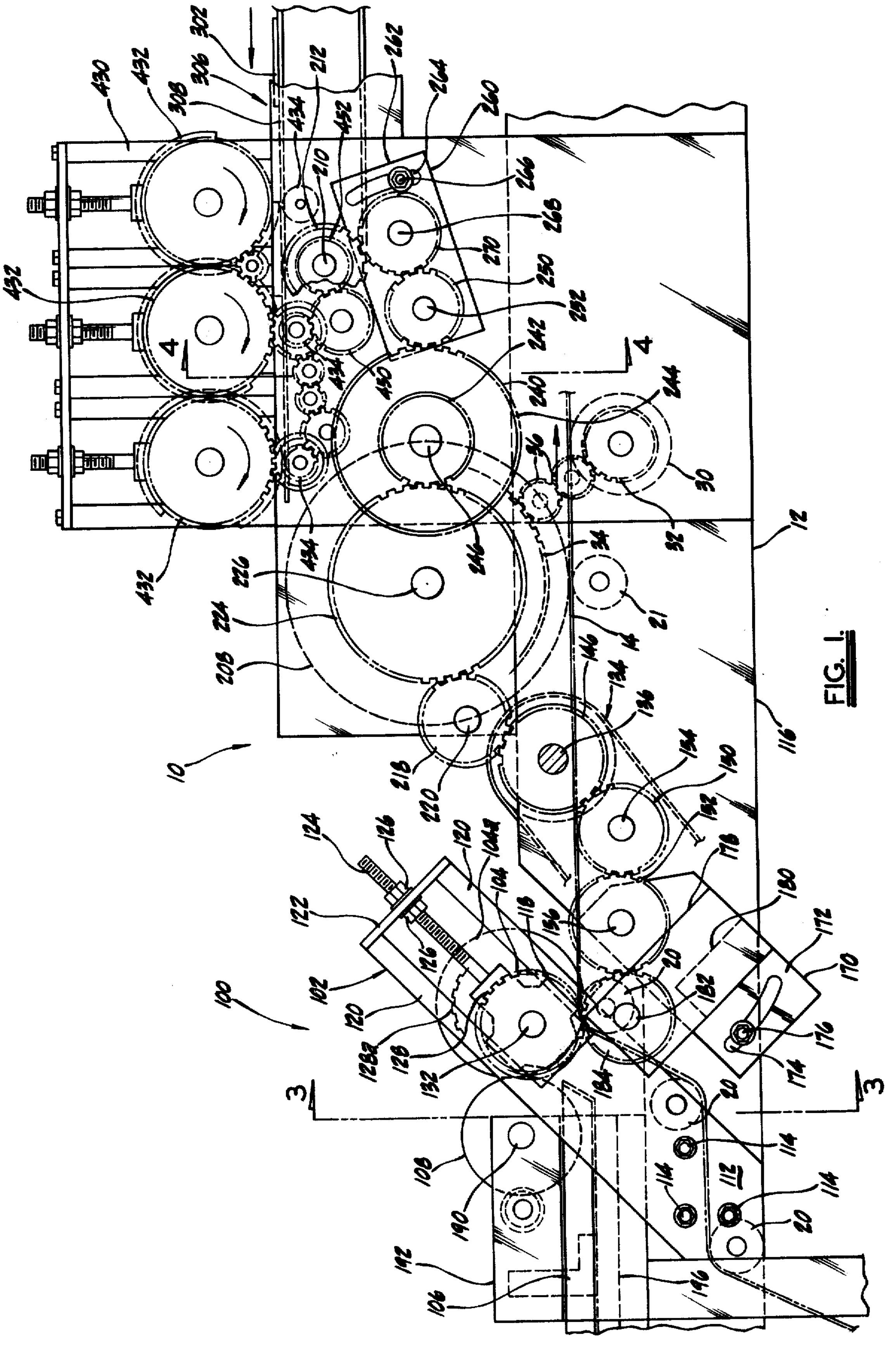
FIG. 1 is a fragmentary elevational view of the gumming apparatus.
Figure 2:
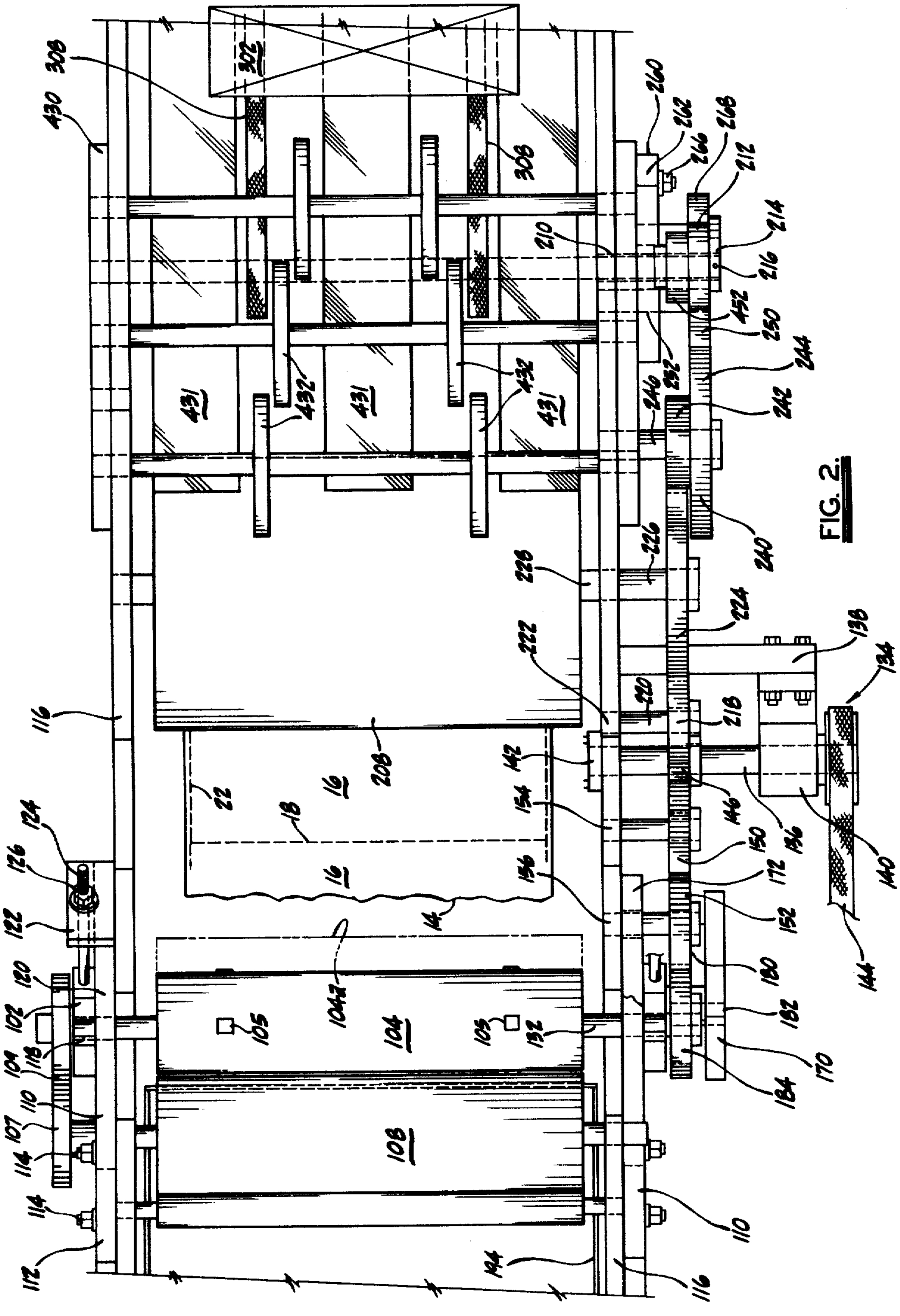
FIG. 2 is a plan view of the apparatus.

Referring now by reference numerals to the drawings and first to FIGS. 1 and 2, it will be understood that the gumming apparatus generally indicated by numeral 100 is used in a machine generally indicated by numeral 10 for processing business forms. The particular machine 10 shown provides a support frame 12 constituting a support means for the gumming apparatus 100 and for several other stations at which various operations are performed on an elongate web 14 dispensed from a web roll (not shown) carried by the frame 12. The web 14 is separated lengthwise into a plurality of business forms 16 by transverse fold lines 18 and the web is conveyed lengthwise of the longitudinal axis of the machine 10 by a conveyor system which includes idler and pressure rollers 20 and 21 respectively. The web 14 includes side perforations 22 which are engaged by one or more pin wheels 30, disposed lengthwise of the machine 10 to insure accurate timing of the conveyed web.

As the carrier web 14 is conveyed lengthwise of the machine 10, it passes through the station 100 which applies gum to the web 14 for attachment of inserts 302 supplied, in the machine 10 used in the preferred embodiment, from an elevated insert conveyor generally indicated by numeral 306. The gumming apparatus 100 includes a gum cylinder assembly 102 providing a gumming cylinder 104 having pads 105 which receive a gum coating from a gum pan 106 by means of a gum applicator roll 108 and apply gum selectively to each of the business forms, said roll being driven by the gumming cylinder as by intermeshing gears 107 and 109 at the opposite end of each cylinder and roll respectively.

Because of the wide range of business form sizes which are processed, the gumming cylinder assembly 102 includes an adjustment feature providing a means by which gum is deposited at selected intervals on the web 14 depending on the length of the individual forms 16. For example, if the forms are 12 inches in length, the gumming surface of the cylinder 104 must have a circumferential length directly related to that form length. This is accomplished in the preferred embodiment by providing a plurality of interchangeable gumming cylinders 104. As noted, inserts 302 are carried by the conveyor 306 from a supply source (not shown) and are deposited on the web 14 at specific intervals. The linear speed of the insert carrying conveyor 306 must be exactly timed in relationship to the linear speed of the web 14 and must be changed when the size of the individual business forms is changed so that inserts are deposited at intervals corresponding to the new length of said forms. In the machine 10 the conveyor 306 and the gumming cylinder 104 are operatively driven from the same drive shaft and the speed change of each is accomplished by changing the gear ratio controlling the angular speed of the gumming cylinder and the linear speed of the insert conveyor 306 at the same time, as will now be described with reference first to FIGS. 1 and 2.

As shown in FIG. 1, the gumming cylinder assembly 102 includes gumming cylinder 104, which is rotatably mounted between a pair of opposed adjustable journal bearings 110. The bearings 110 include bifurcated side plates 112, which are attached as by fasteners 114 to upper members 116 of the machine frame 12, and a journal bearing crosshead 118 received in sliding relation between arms 120 of said side plates. The arms 120 are connected together by means of an apertured end member 122 attached thereto as by fasteners and the sliding crosshead 118 is adjusted by means of a threaded rod 124, said rod is attached at one end to the crosshead 118 and is received by the end member 122 at the other end, a pair of nuts 126 being provided to selectively fix the position of said crosshead, and therefore, the axis of rotation of the gumming cylinder 104, relative to the journal mounting 110. Importantly, the gumming cylinder 104 is provided with an end gear 128 having a boss 130 by which it is fixedly attached to the cylinder shaft 132.

Figure 3:
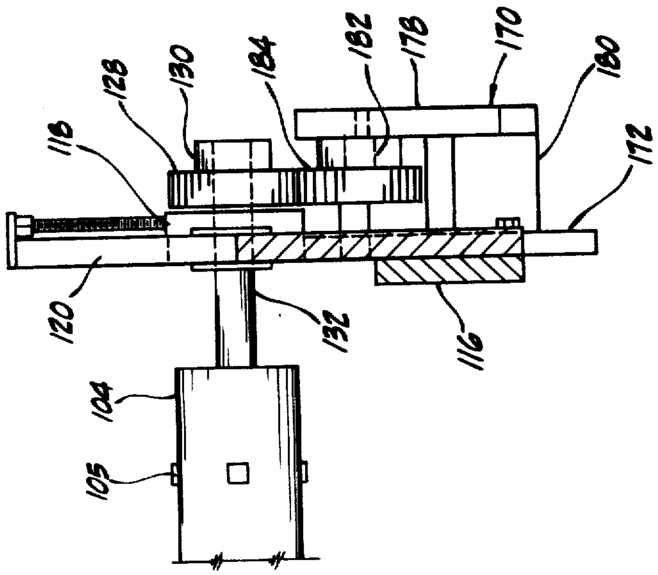
FIG. 3 is a cross sectional view taken on line 3—3 of FIG. 1.

The cylinder end gear 128 is driven by a drive assembly generally indicated by numeral 134. As best shown in FIG. 2, the drive assembly 134 includes a drive shaft 136 which is rotatively mounted to the frame upper member 116 by means of an outstanding bracket 138 fixedly attached to said frame and carrying a journal bearing 140. The shaft 136 is driven by a pulley and belt assembly 144 from a motor (not shown) and includes a drive gear 146 fixedly mounted to said shaft 136. The drive assembly 134 which drives the cylinder end gear 128 includes idler gears 150 and 152, rotatively mounted to the frame member 116 by stub shafts 154 and 156 and a swing gear assembly 170. The swing gear assembly 170, which is best understood by reference to FIGS. 1 and 3, includes an inner plate 172, which is pivotally mounted to the shaft 156 of idler gear 152 and is provided with an arcuate slot 174 and a clamping screw 176. The clamping screw 176 is threadedly received by the frame member 116 and provides a means by which the location of the plate 172 can be selectively fixed in position relative to said frame member. The swing gear assembly 170 also includes an outer plate 178 attached to said inner plate 172, as by a bracket 180 welded therebetween, and said outer plate 178 is provided with a stub shaft 182 fixedly attached thereto and carrying an idler gear 184 thereon which engages the cylinder gear 128 and the idler gear 152.

This structural arrangement of parts permits the gumming cylinder 104 to be replaced by a different cylinder 104*a* of a diameter to suit a different size of individual web form by simply removing the cylinder 104 together with the sliding crosshead 118 and replacing it with a new cylinder 104*a* and crosshead, said new cylinder having a different end gear 128*a*. The new cylinder 104*a* is adjusted until it operatively engages the applicator roll 108 and the position of the swing gear 184 is adjusted until it engages the new end gear 128*a*. As shown in FIG. 1, the applicator roll 108 is journal mounted on a shaft 190 extending between brackets 192 fixedly attached to the frame upper member 116 and is partially immersed in gum provided in the pan 106 carried by a cross frame member 196 fixedly attached between said oppositely disposed upper frame members 116.

Figure 4:
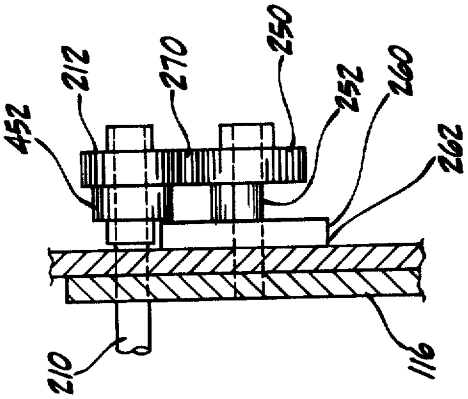
FIG. 4 is a cross sectional view taken on line 4—4 of FIG. 1.

In addition to providing the drive means for the gumming cylinder 104, the drive assembly 134 also provides the drive means for the conveyor assembly 306 by which inserts are transported from a supply source and are deposited on the web 14 for attachment to said web at timed intervals by gum applied to said web by the gumming cylinder 104. This arrangement is as follows:

The conveyor assembly 306 includes an endless belt 308 which carries the inserts 302 on the upper surface thereof and is driven between a front roll shaft 210 and a rear roll shaft (not shown). The shaft 210 is rotatively mounted between the oppositely disposed frame upper members 116 and is provided with an end gear 212 having a boss 214 and a set screw 216 by which said end gear is fixedly but removably attached to said conveyor shaft 210. The gear 212 is operatively driven from the drive gear 146 mounted to the drive shaft 136 through a portion of the drive assembly 134. This portion of the drive assembly includes an idler gear 218 rotatively mounted to the frame upper member 116 by stub shaft 220 and a gear 224 carried at the end of the shaft 226 of a turn cylinder 208, which is mounted to the frame members 116 as by journal bearings. The drive assembly also includes a compound idler gear 240, including an inner gear 242 and an outer gear 244 rotatively mounted to the frame member 116 by stub shaft 246, an idler gear 250 rotatively mounted to the frame 116 by stub shaft 252 and a swing gear assembly 260 which is best understood by reference to FIGS. 1 and 4. The swing gear assembly 260 includes a swing plate 262 which is pivotally mounted to the shaft 252 of idler gear 250 and is provided with an arcuate slot 264 and a clamping screw 266. The clamping screw 266 is received by the frame member 116 and provides a means by which the location of the plate 262 can be selectively fixed in position relative to said frame member. The swing plate 262 has a stub shaft 268 attached thereto carrying an idler gear 270.

This structural arrangement of parts permits the conveyor shaft gear 212 to be replaced by a different gear and thereby adjust the speed of the conveyor to deposit inserts onto the continuous web 14 at a rate corresponding to the length of the individual forms. The change is effectuated by simply adjusting the position of the swing gear 270 until it engages the new gear, following removal and replacement of said gear 212.

The gumming cylinder assembly 102 including the end gear 128, cross heads 118 and associated parts can be removed from its associated side plates 112 for replacement and may be stored for convenience in a rack together with its corresponding end gear 212 of conveyor 306. These units are marked with related indicia so that the appropriate gumming cylinder 104 and its corresponding conveyor gear 212 can be readily located for use together in combination. In the preferred embodiment, the cylinder end gear 128 and the conveyor end gear 212 are identical gears which facilitates the replacement process.

As discussed above, the conveyor 306 transports inserts 302 in the direction of the gumming cylinder 104 for deposit onto the continuous web 14. In the preferred embodiment shown this is accomplished as by an intermediate conveyor system generally indicated by numeral 430. This assembly includes table plates 431, a plurality of disc conveyors 432 and cooperating rollers 434 driven by a gear train generally indicated by numeral 450 by means of a gear 452 attached to shaft 210, and transfers the inserts to a turn cylinder 208 for deposit of the inserts 302 onto the web 14.

The turn cylinder 208 is driven by the drive assembly 134 and in turn drives the pin wheel 30 as by a gear 34 connected to a pin wheel gear 32 through idler gears 36. This gear train is sized so that the surface speed of the turn conveyor 208 which engages the web 14 is equal to the speed of the web 14. Pressure roller 21 is also driven by the turn conveyor 208 in a like manner (not shown).

Thus, by changing the size of the gumming cylinder 104 and the insert conveyor gear 212, individual web sections 16 of different length can be processed while maintaining the speed of the web 14 and the turn conveyor at a constant value.

I claim as my invention:

1. A gumming apparatus for use in a business form machine of the type used for processing an elongate web which is separated lengthwise into a plurality of individual sections by transverse separation lines, the apparatus comprising:
(a) support means having a longitudinal axis,
(b) first conveyor means mounted to the support means for conveying the web lengthwise of the support means,
(c) a gum supply,
(d) a gumming cylinder receiving gum from the gum supply, said gumming cylinder being diametrically sized to apply gum to the web at equal intervals along the length of the web, the gumming cylinder having a circumferential length directly related to the length of the individual sections,
(e) mounting means removably mounting the gumming cylinder to the support means transversely of the web for removal of said cylinder and replacement thereof by a cylinder of a different diameter and rotatable about a different axis of rotation to apply gum to the web at different equal intervals along the length thereof, and
(f) drive means including means driving the web at a selected linear speed and means rotating the gumming cylinder at a cooperating angular speed.

2. A gumming apparatus as defined in claim 1, in which:
(g) a second conveyor means is mounted to the support means for conveying articles to the web for attachment thereto, said second conveyor including a rotatable drive member, and
(h) the drive means includes means rotating the conveyor drive member at a selected angular speed for movement of the conveyed articles at a speed related to the speed of the web and the length of the individual sections for deposit of the conveyed articles on the individual sections.

3. An apparatus as defined in claim 2, in which:
(i) the means rotating the gumming cylinder include a drive gear attached to said cylinder,
(j) the means rotating the conveyor rotatable drive member include a removable drive gear attached to said member, and
(k) the removable gumming cylinder diameter, the pitch circle diameter of the gumming cylinder drive gear, and the pitch circle diameter of the removable conveyor drive gear are proportionately related, the relationship being the same for all cylinders, attached gears and conveyor gears to maintain the same linear web speed and change the linear speed of the second conveyor and the angular speed of the gumming cylinder when said gumming cylinder and conveyor drive gear are changed.

4. An apparatus as defined in claim 3, in which:
(l) the removable gumming cylinder drive gear and the removable conveyor drive gear are of the same pitch circle diameter.

5. An apparatus as defined in claim 3, in which:
(l) the drive means includes a common drive shaft operatively connected to the removable gumming cylinder gear and the removable conveyor drive gear, a gear train connecting the common drive shaft to the removable gumming cylinder drive gear, and a gear train connecting the common drive shaft to the removable conveyor drive gear.

6. An apparatus as defined in claim 1, in which:
(g) the means rotating the gumming cylinder include a drive gear attached to said cylinder, and
(h) the removable gumming cylinder diameter and the pitch circle diameter of the attached drive gear are proportionately related, the relationship being the same for all cylinders and attached gears to maintain the same linear web speed.

7. An apparatus as defined in claim 6, in which:
(i) the gumming cylinder includes a shaft carrying the drive gear, and
(j) the mounting means includes opposed mounting plates receiving sliding journal bearings removably mounting the shaft in adjustable relation to the mounting means to change the location of the axis of rotation of different cylinders.

8. An apparatus as defined in claim 1, in which:
(g) the drive means includes means driving the web at a linear speed independent of the particular angular speed of the selected gumming cylinder.

9. A gumming apparatus for use in a business form machine of the type used for processing an elongate web which is separated lengthwise into a plurality of individual sections by transverse separation lines, the apparatus comprising:
(a) support means having a longitudinal axis,
(b) first conveyor means mounted to the support means for conveying the web lengthwise of the support means,
(c) a gum supply,
(d) a gumming cylinder receiving gum from the gum supply, said gumming cylinder being diametrically sized to apply gum to the web at equal intervals along the length of the web,
(e) mounting means removably mounting the gumming cylinder to the support means transversely of the web for removal of said cylinder and replacement thereof by a cylinder of a different diameter to apply gum to the web at different equal intervals along the length thereof,
(f) drive means including means driving the web at a selected linear speed and means rotating the gumming cylinder at a cooperating angular speed,
(g) the means rotating the gumming cylinder including a drive gear attached to said cylinder,
(h) the removable gumming cylinder diameter and the pitch circle diameter of the attached drive gear being proportionately related, the relationship being the same for all cylinders and attached gears to maintain the same linear web speed,
(i) the drive means including a drive shaft and a gear train operatively connecting the drive shaft to the gumming cylinder drive gear, and
(j) the gear train including an idler gear pivotally mounted to the support means for swinging movement into and out of engagement with the gumming cylinder drive gear to accommodate a size change of said cylinder drive gear.

10. A gumming apparatus for use in a business form machine of the type used for processing an elongate web which is separated lengthwise into a plurality of individual sections by transverse separation lines, the apparatus comprising:

(a) support means having a longitudinal axis, (b) first conveyor means mounted to the support means for conveying the web lengthwise of the support means, (c) a gum supply, (d) a gumming cylinder receiving gum from the gum supply, said gumming cylinder being diametrically sized to apply gum to the web at equal intervals along the length of the web, (e) mounting means removably mounting the gumming cylinder to the support means transversely of the web for removal of said cylinder and replacement thereof by a cylinder of a different diameter to apply gum to the web at different equal intervals along the length thereof, (f) drive means including means driving the web at a selected linear speed and means rotating the gumming cylinder at a cooperating angular speed, (g) a second conveyor means mounted to the support means for conveying articles to the web for attachment thereto, said second conveyor including a rotatable drive member, (h) the drive means including means rotating the conveyor drive member at a selected angular speed for movement of the conveyed articles at a speed related to the speed of the web, (i) the means rotating the gumming cylinder including a drive gear attached to said cylinder, (j) the means rotating the conveyor rotatable drive member including a removable drive gear attached to said member, (k) the removable gumming cylinder diameter, the pitch circle diameter of the gumming cylinder drive gear, and the pitch circle diameter of the removable conveyor drive gear being proportionately related, the relationship being the same for all cylinders, attached gears and conveyor gears tp maintain the same linear web speed and change the linear speed of the second conveyor when said gumming cylinder and conveyor drive gear are changed, (l) the drive means including a common drive shaft operatively connected to the cylinder gear and the conveyor drive gear, a gear train connecting the common drive shaft to the gumming cylinder drive gear, and a gear train connecting the common drive shaft to the conveyor drive gear, and (m) the gear train connecting the common drive shaft to the gumming cylinder drive gear including an idler gear pivotally mounted to the support means for swinging movement into and out of engagement with the gumming cylinder drive gear to accommodate a size change of said gumming cylinder drive gear.

11. A gumming apparatus for use in a business form machine of the type used for processing an elongate web which is separated lengthwise into a plurality of individual sections by transverse separation lines, the apparatus comprising:

(a) support means having a longitudinal axis, (b) first conveyor means mounted to the support means for conveying the web lengthwise of the support means, (c) a gum supply, (d) a gum cylinder receiving gum from the gum supply, said gumming cylinder being diametrically sized to apply gum to the web at equal intervals along the length of the web, (e) mounting means removably mounting the gumming cylinder to the support means transversely of the web for removal of said cylinder and replacement thereof by a cylinder of a different diameter to apply gum to the web at different equal intervals along the length thereof, (f) drive means including means driving the web at a selected linear speed and means rotating the gumming cylinder at a cooperating angular speed, (g) a second conveyor means mounted to the support means for conveying articles to the web for attachment thereto, said second conveyor including a rotatable drive member, (h) the drive means including means rotating the conveyor drive member at a selected angular speed for movement of the conveyed articles at a speed related to the speed of the web, (i) the means rotating the gumming cylinder including a drive gear attached to said cylinder, (j) the means rotating the conveyor rotatable drive member including a removable drive gear attached to said member, (k) the removable gumming cylinder diameter, the pitch circle diameter of the gumming cylinder drive gear, and the pitch circle diameter of the removable conveyor drive gear being proportionately related, the relationship being the same for all cylinders, attached gears and conveyor gears to maintain the same linear web speed and change the linear speed of the second conveyor when said gumming cylinder and conveyor drive gear are changed, (l) the drive means including a common drive shaft operatively connected to the cylinder gear and the conveyor drive gear, a gear train connecting the common drive shaft to the gumming cylinder drive gear, and a gear train connecting the common drive shaft to the conveyor drive gear, and (m) the gear train connecting the common drive shaft to the conveyor drive gear including an idler gear pivotally mounted to the support means for swinging movement into and out of engagement with the conveyor gear to accommodate a size change of said conveyor drive gear.

12. A gumming apparatus for use in a business form machine of the type used for processing an elongate web which is separated lengthwise into a plurality of individual sections by transverse separation lines, the apparatus comprising:

(a) support means having a longitudinal axis, (b) first conveyor means mounted to the support means for conveying the web lengthwise of the support means, (c) a gum supply, (d) a gumming cylinder receiving gum from the gum supply, said gumming cylinder being diametrically sized to apply gum to the web at equal intervals along the length of the web, (e) mounting means removably mounting the gumming cylinder to the support means transversely of the web for removal of said cylinder and replacement thereof by a cylinder of a different diameter to apply gum to the web at different equal intervals along the length thereof, (f) drive means including means driving the web at a selected linear speed and means rotating the gumming cylinder at a cooperating angular speed, (g) the means rotating the gumming cylinder including a drive gear attached to said cylinder, (h) the drive means including a drive shaft and a gear train operatively connecting the drive shaft to the gumming cylinder drive gear, and (i) the gear train including an idler gear pivotally mounted to the support means for swinging movement into and out of engagement with the gumming cylinder drive gear to accommodate a size change of said cylinder drive gear.

* * * * *